United States Patent [19]

Kondo et al.

[11] 3,847,605
[45] Nov. 12, 1974

[54] PHOTOSENSITIVE MATERIAL FOR ELECTROPHOTOGRAPHY

[75] Inventors: Eiichi Kondo; Tetsuo Hasegawa, both of Tokyo, Japan

[73] Assignee: Canon Kabushiki Kaisha, Tokyo, Japan

[22] Filed: Mar. 4, 1971

[21] Appl. No.: 121,187

[30] Foreign Application Priority Data

Mar. 9, 1970 Japan.................................. 45-20237

[52] U.S. Cl..................................... 96/1.5, 252/501
[51] Int. Cl.............................................. G03g 5/04
[58] Field of Search ................ 96/1.5, 1.8; 252/501; 260/81

[56] References Cited
UNITED STATES PATENTS

| | | | |
|---|---|---|---|
| 3,037,861 | 6/1962 | Hoegl et al. | 96/1.5 |
| 3,240,594 | 3/1966 | Cassiers et al. | 96/1.5 |
| 3,421,891 | 1/1969 | Inami et al. | 96/1.5 X |
| 2,364,030 | 11/1944 | Snyder et al. | 260/81 |
| 3,627,524 | 12/1971 | Kinjo et al. | 96/1.5 |

OTHER PUBLICATIONS

Mellan, I. Industrial Plasticizers, MacMillan Co. 1963 (p. 254–265, 275–279).

Lee, H. and K. Neville, Epoxy Resins, McGraw-Hill Book Co., 1957 (pp. 18–21).

*Primary Examiner*—Charles E. Van Horn

[57] ABSTRACT

A photosensitive material for electrophotography comprises mainly an organic photoconductive material composed of 100 parts of a polymer having a chlorine substituted 9-vinylcarbazole unit and 5 – 100 parts of cumarone resin having average molecular weight of 200 – 800.

1 Claim, No Drawings

PHOTOSENSITIVE MATERIAL FOR ELECTROPHOTOGRAPHY

BACKGROUND OF THE INVENTION

1. Field of the Invention

This invention relates to a photosensitive material for electrophotography composed of chlorine substituted polyvinylcarbazole and cumarone resin.

2. Description of the Prior Art

As photosensitive materials for electrophotography, there are known various inorganic or organic photoconductive materials. Among them, inorganic photoconductive materials such as zinc oxide, selenium, selenium-tellurium alloy, selenium sulfide, cadmium sulfide and the like have excellent photosensitivity, but are so poor in transparency, light weight, flexibility and film shapability that their application in photosensitive material field is limited to a great extent.

On the contray, for many organic photoconductive materials are known as compared with inorganic photoconductive materials. As organic photoconductive materials of low molecular weight type, there may be mentioned acyl hydrazone derivatives, oxadiazole derivatives, pyrazolyl derivatives, imidazolone derivatives, imidazothione derivatives, benzimidazole derivatives, benzoxazole derivatives, and benzthiazole derivatives. As organic photoconductive materials of high polymer type, there may be mentioned polymers containing carbazole rings as disclosed in Japanese Patent Publication Nos. 10966/1959, 812/1961, 18674/1967 and 25230/1967 and polymers containing polynuclear aromatic rings such as naphthalene and anthracene. These organic photoconductive materials are excellent in transparency, light weight and film shapability due to intrinsic property of organic substances, and are expected to have wide application fields as photosensitive materials.

However, the practicability of organic photoconductive materials is far lower than that of inorganic photoconductive materials since photosensitivity of the organic photoconductive material is very lower than that of inorganic one and, in addition, organic photoconductive materials have other many physical properties to be improved. With respect to photosensitivity, organic photoconductive materials are improved to a great extent as the result of remarkable progress of organic synthesis, and many organic photoconductive materials of high photosensitivity, excellent sensitizers and sensitizing methods are now available. However, with respect to other physical properties, there have not yet been improved, and these remaining drawbacks are the obstacle to practicability of organic photoconductive materials.

For example, organic photoconductive materials of high polymer type have film shapability, but have strong intermolecular cohesion and are hard and brittle. Further, organic photoconductive materials of high polymer type have low adhesiveness to a support. Organic photoconductive materials of low molecular weight type lack in film shapability and therefore, they are usually used together with a binder resin. However, such binder resins are ofter poor in flexibility and adhesiveness to a support.

Most drawbacks of physical properties of organic photoconductive materials can be solved by improving the flexibility. Therefore, as plasticizers for photosensitive layer, there have been used, for example, dioctylphthalate, tricresylphosphate, and epoxy resin of low molecular weight for improving flexibility.

Although these plasticizers can surely improve the flexibility, they suffer from other drawbacks. For example, dioctylphthalate and tricresylphosphate remarkably lower the surface potential which is one of the important electrophotographic properties, and epoxy resin of low molecular weight lowers the photosensitivity to a great extent. Therefore, such improvement is accompanied by unfavorable effects against the electrophotographic characteristics, but is not satisfactory for solving the problems of organic photoconductive materials.

SUMMARY OF THE INVENTION

Parts and percent used in this specification and claims are by weight unless otherwise stated.

This invention relates to a photosensitive material for electrophotography which comprises mainly an organic photoconductive material composed of 100 parts of a polymer having a chlorine substituted 9-vinylcarbazole unit and 5 – 100 parts of cumarone resin having average molecular weight of 200 – 800.

An object of this invention is to provide a photosensitive material for electrophotography having a good flexibility without deteriorating the sensitivity.

Another object of this invention is to provide a photosensitive material for electrophotography of high transparency, light weight and good film shapability as well as of high sensitivity.

DETAILED DESCRIPTION OF THE INVENTION

According to this invention, a cumarone resin of average molecular weight of 200 – 800, preferably 200 – 300, as plasticizer, is added to a polymer having chlorine substituted 9-vinylcarbazole unit as organic photoconductive material of high polymer type in an amount of 5 – 100 percent by weight, preferably 10 – 50 percent by weight on the basis of the polymer, and the resulting matter is an excellent photosensitive material for electrophotography.

If desired, a binder resin, and various chemical or optical sensitizers may be added.

The polymer having chlorine substituted 9-vinylcarbazole unit may be obtained by various methods. For example, a poly-9-vinylcarbazole is chlorinated, or chlorine substituted 9-vinylcarbazole is polymerized or copolymerized with other monomers.

chlorine substituted poly-9-vinylcarbazole obtained by chlorinating poly-9-vinylcarbazole may have chlorine contents ranging widely, and there may be obtained photosensitive materials having varying photosensitivity and spectral absorption characteristic depending upon the degree of chlorination.

When chlorinated 9-vinylcarbazole is polymerized or copolymerized with other monomers, the chlorine contents of the resulting polymer may be controlled over wide range by appropriately selecting the chlorine contents of the starting chlorine substituted 9-vinylcarbazole itself. The resulting chlorine substituted poly-9-vinylcarbazole may be further chlorinated to control the chlorine contents.

The chlorine contents in the chlorine substituted poly-9-vinylcarbazole employed in this invention may vary depending upon the desirable characteristics for each particular application in electrophotography, but, in general, chlorine contents of 2 to 43 percent are preferable.

Some preparation examples of polymers having chlorine substituted 9-vinylcarbazole unit are shown below.

Chlorine substituted poly-9-vinylcarbazole can be prepared by treating poly-9-vinylcarbazole with a chlorinating agent such as chlorine, sulfuryl chloride and the like, and the degree of chlorination can be optionally changed by changing the amount of chlorinating agent.

There is below detailed the condition for process of chlorination with sulfuryl chloride.

To a homogeneous solution of poly-9-vinylcarbazole in the selected media from the below-indicated Table, sulfuryl chloride or the dilute solution thereof was dropwise added with stirring at room temperature or cooled temperature. The reaction was accomplished with stirring at room temperature or about 30°C, or when chlorine substitution degree was over 2.0 about 70°C at maximum. The starting material and solvent must be used as anhydrously as possible and the reaction vessel was prevented from moisture.

The solvent was selected from the below-indicated Table according to the desired chlorine substitution degree. While the adaptability of the solvents is due to the solubility of the product, it is impossible to remove the colour of the product by a purification procedure comprising a dissolution and precipitation when unsuitable solvent such as the class A indicated in the below Table, which is used for high degree of chlorine substitution, was used, and the product was coloured yellow, insoluble.

Table 1

| degree of chlorine substitution | Class | Example of Solvent |
|---|---|---|
| below 2 | A and B | methylene chloride, 1.2-dichloroethane, sym-tetrachloroethane, benzene, chlorobenzene |
| 2 –4 | B | chlorobenzene, dichlorobenzene |

When under the above-mentioned condition, the reaction was carried out, the chlorine substitution was accomplished stoicheometricly in correspond with the used amount of sulfuryl chloride. Therefore, the amount of sulfuryl chloride can be determined from the desired degree of chlorine substitution.

For example, chlorine substituted poly-9-vinylcarbazole or chlorine substituted 9-vinylcarbazole having one chlorine atom per one carbazole ring is desired, 1.0 mole of sulfuryl chloride per 1.0 mole of carbazole unit is used. However, when a higher degree of chlorination, particularly, 3 to 4 atoms per carbazole ring, a little excess of sulfuryl chloride is advantageously used due to reaction time and reaction temperature. Even in this case, when the reaction conditions are maintained at constant, the reproducibility of degree of chlorine substitution is high. After completion of the reaction, the reaction mixture is poured into a large amount of polar solvent, preferably, methanol with vigorous stirring to precipitate the polymer. The precipitate is filtered, dissolved in a solvent of class A or B, poured into methanol again to precipitate. Once to three times of cycle of dissolution and precipitation are usually sufficient. It is particularly preferable for electrophotography to pour a chlorobenzene solution to methanol.

In some cases, for example, that problem of economy is important, the polymer is not recovered as solid, but as a solution. For example, such solution is directly used as a coating solution by adding sensitizer, plasticizer and the like to the solution. In such case as the reaction solvent, benzene or chlorobenzene is used and inert gas such as nitrogen is blown into the reaction solution during or after the reaction to remove hydrogen chloride and sulfur dioxide as reaction by product. During introduction of inert gas, the solution may be heated. In this case it is possible to control the concentration of the coating solution by distilling away the solvent at an appropriate temperature. However, since foaming often occurs at temperatures higher than the boiling point of the solvent, the control of concentration of coating solution is preferably effected by adjusting the amount of solvent used during the reaction. According to the above procedure, hydrogen chloride and sulfur dioxide are substantially removed. If a complete removal of them is desired, the benzene or chlorobenzene reaction solution is washed with water after completion of reaction and then dried on anhydrous sodium sulfate and anhydrous magnesium sulfate and the dehydrating agent is separated by centrifugal precipitation or filtration. The resulting solution can be used as a coating solution.

The following are examples of preparation of chlorine substituted poly-9-vinylcarbazole.

PREPARATION EXAMPLE 1

Poly-9-vinylcarbazole (Luvican M-170, trade name, supplied by Badische Anilin und Soda Fabrik) (4 g.) was dissolved in 200 ml. of dry methylene chloride in a three-necked flask equipped with a reflux condenser having a calcium chloride tube and a dropping funnel.

A solution of sulfuryl chloride in methylene chloride (20 percent by volume) was dropwise added to the poly-9-vinylcarbazole solution at 0°C with stirring. After completion of the addition, reaction was carried out at temperatures shown in the following table for 3 hours. The reaction mixture was then poured into a large amount of methanol to precipitate the polymer and the polymer thus precipitated was thoroughly washed and dried.

| Experiment No. | Amount of 20% solution of SO$_2$Cl$_2$ | Reaction temperature | Yield |
|---|---|---|---|
| 1 | 2.57 ml. | 0°C | 4.1 g. |
| 2 | 5.40 ml. | 20°C | 4.2 g. |
| 3 | 10.77 ml. | 20°C | 4.5 g. |
| 4 | 21.54 ml. | 30°C | 5.2 g. |

The above mentioned chlorine substituted polyvinylcarbazole was precipitated again by a system of monochlorobenzene-methanol and purified.

The result of analysis was as follows:

| Experiment No. | Cl | N |
|---|---|---|
| 1 | 4.25 | 7.00 |
| 2 | 8.40 | 6.32 |
| 3 | 15.2 | 6.30 |
| 4 | 27.8 | 5.25 |

The contents of chlorine in the above-mentioned polymer almost correspond to the mole number of sulfuryl chloride used for this reaction.

A chlorine substituted poly-9-vinylcarbazole of high chlorine contents (particularly 30 – 43 percent chlorine) can be obtained by using monochlorobenzene as solvent.

PREPARATION EXAMPLE 2

In a three necked flask equipped with a blowing tube having a capillary end, an agitator and a thermometer, poly-9-vinylcarbazole (trade name Luvican M-170) 20 gr. was dissolved into a mixture of pyridine 60 ml. and methylene chloride 500 ml., and with vigorously stirring cooled at −10°C, to the mixture, chlorine gas (7.3 g.) was gradually introduced. Then, the solution treated with chlorine gas was poured into methanol to deposit the precipitate polymer followed by dissolving the obtained polymer in chlorobenzene. The polymer thus obtained was reprecipitated from methanol to obtain a white polymer. The resultant was identified as mainly composed of poly-3-chloro-9-vinylcarbazole from the infrared data. The chlorination process can be modified by initial treatment with sulfunyl chloride followed by the gradual introduction of chlorine gas. Such modification process enables to raise the chlorination degree.

In the production of polymer from chlorine substituted 9-vinylcarbazole, the control of chlorine content can be carried out by the number of substituted chlorine in chlorinated 9-vinylcarbazole. In the use of monochlorinated, dichlorinated and trichlorinated 9-vinylcarbazoles, the polymerization was carried out on the combination of one or more kinds of the chlorinated 9-vinylcarbazoles. The other monomer can be copolymerized with vinylcarbazoles for control of chlorine number. Chlorine substituted compounds including various kinds of vinyl carbazoles can be prepared by a roundabout method of production and particular processes for a substituted position, substituted chlorine number and various compounds having various substituted position and chlorine number.

There is below mentioned the practical and economical produced compounds for polymerization;
  monochloro compounds such as
  1-chloro-9-vinylcarbazole,
  3-chloro-9-vinylcarbazole;
  dichloro compounds such as
  1,3-dichloro-9-vinylcarbazole,
  1,6-dichloro-9vinylcarbazole,
  3,6-dichloro-9-vinylcarbazole;
  trichloro compounds such as
  1,3,6-trichloro-9-vinylcarbazole.

The chlorination procedure which can be replaced for the above-mentioned procedure can be accomplished by the introduction of a purified chlorine gas in rate of very low velocity under the cautiously controlled condition, with vigorous stirring in a solution such as benzene and monochlorobenzene, or the addition of glacial acetic acid in amount of below 5 percent therein at low temperature.

There is below illustrated the process for the production of the polymer from chlorine substituted 9-vinylcarbazole. The starting material such as chlorine substituted 9-vinylcarbazole can be produced by various process e.g.

1. reaction with acetylene in a presence of alkali catalyst according to Reppe synthesis for chlorine substituted carbazole, which was reported in for example Journal of Kogyo Kagaku Vol. 59 page 511, (1956), by Otsuka and Murahashi.
2. a process comprising a reaction of alkali salt of chlorinated carbazole with ethylene oxide in an inert solvent such as xylene followed by a dehydration of the provided 9-ethylol carbazole.
3. a process comprising a halogenation of 9-ethylol carbazole or 9-β-chloroethyl carbazole followed by a dehydration or dehydrochlorination of the provided produce.

The thus provided chlorine substituted 9-vinylcarbazole is polymerized under non-catalystic heating, in the presence of radical polymerization initiator or Lewis acid, or by photopolymerization. The below-mentioned Example is referring to a process for the production of chlorine substituted 9-vinylcarbazole.

PREPARATION EXAMPLE 3

Production of 3-chloro-9-vinylcarbazole

Carbazole 20 gr. was dissolved in a mixture of pyridine 60 ml. and chloroform 60 ml. and chlorine gas was introduced thereto with vigorous stirring. When an absorbed amount of chlorine gas reached to 5 gr., the introduction was stopped. Then after stirring for about 1 hour, the reaction mixture was poured into dilute hydrochloric acid, and therefrom chloroform was discharged away. The precipitate was filtered and then recrystallized from methanol. The resultant was 3-chlorocarbazole 10 gr. the yield; about 42 percent, melting point; 197° – 200°C (reference value 201°C). The unreacted carbazole was collected from a residue insoluble in methanol. In an autoclave containing 100 ml., 3-chlorocarbazole 4.0 gr., powdered caustic potash 0.075 gr. and zinc oxide 0.025 gr. are shaked with cyclohexane 5 ml. Acetylene was introduced thereto and the reaction was carried out at 170°C – 180°C for 6 hours (the initial pressure was 25 atms.). The reaction mixture was poured into water after cooled and a discharge of acetylene, and the precipitate was filtered and recrystallized from n-hexane. The resultant was 3-chloro-9-vinylcarbazole 3.6 gr. yield; about 80 percent, melting point; 78°C.

Analysis: Calculated: C, 73.9; H, 4.39; N, 6.16; Cl, 15.6
Found: C, 73.4; H, 4.20; N, 6.10; Cl, 15.2.

PREPARATION EXAMPLE 4

Production of 3,6-dichloro-9-vinylcarbazole

Carbazole 8.4 gr. was suspended in carbon disulfide 80 ml., and then chlorine gas was introduced therein with vigorous stirring at 3°C. The mixture was heated at 45°C for further 1 hour for continuing the reaction. The hot reaction mixture was filtered and the resulting crystalline was washed with carbon disulfide, and recrystallized from glacial acetic acid. The resultant was 3,6-dichlorocarbazole 6.1 gr., the yield; about 60 percent, m.p.; 204°C (reference value 206°C). 3,6-Dichloro carbazole 4.0 gr., powdered caustic potash 0.07 gr. and cyclohexane 5 ml. were held in a 100 ml. autoclave, and thereto acetylene was introduced (the initial pressure was 25 atms.), and the reaction was carried out at 170°C for 6 hours. The reaction mixture was poured into water after cooled and discharge of acetylene, and then the precipitate was filtered and recrystallized from n-hexane. The resultant was 3,6-dichloro-9-vinylcarbazole 3.5 gr., the yield; about 79 percent, m.p.; 125°C.

Analysis calculated: C, 64.0; H, 3.44; N, 5.35; Cl, 27.1
Found: C, 64.3; H, 3.40; N, 5.30; Cl, 26.7.

Other chlorine substituted 9-vinylcarbazoles may be produced in a way similar to the above-mentioned procedures. In the followings are described preparation examples for chlorinated poly-9-vinylcarbazoles by polymerizing chlorine substituted 9-vinylcarbazoles.

PREPARATION EXAMPLE 5

Production of poly-3-chloro-9-vinylcarbazole

Process (1)

In a three necked flask, 3-chloro-9-vinylcarbazole 3.0 gr. was dissolved into methylene chloride 10 ml. and nitrogen gas substituted for atmosphere. The mixture was cooled at −20°C. A drop of boric etherate trifluoride solution was added to the mixture with stirring. Immediately, it is observed that a temperature increased to initiate the polymerization. Concentrated ammonia water was added to the reaction mixture to quench the polymerization. Methanol was added thereto to precipitate the polymer. The resulting precipitate was dissolved into benzene and methanol was added thereto to recrystallize them. Such procedure was repeated twice. The resultant was a white polymer 2.5 gr., the yield; about 83 percent. The intrinsic viscosity in benzene was $(\eta) = 0.06$.

Process (2)

To a quartz tube in use for polymerization containing 3-chloro-9-vinylcarbazole 1.0 gr. in a solution of acetonitrile 4.0 ml., the irradiation of high pressure mercury lamp was applied. Methanol was added to the reaction mixture, and the resulting precipitate was filtered and dissolved in benzene followed by precipitating the polymer. The resultant was a white polymer 0.65 gr., the yield; about 65 percent. The intrinsic viscosity in benzene was $(\eta) = 0.10$.

PREPARATION EXAMPLE 6

Production of poly-3,6-dichloro-9-vinylcarbazole

A polymerization tube substituted with nitrogen contained 3,6-dichloro-9-vinylcarbazole 1.0 gr. and was heated at 120°C for 3 hours. The reaction mixture was dissolved in chlorobenzene and precipitated by methanol. The resultant was a white polymer 0.8 gr., the yield; about 80 percent. The characteristic viscosity in benzene was $(\eta) = 0.055$.

PREPARATION EXAMPLE 7

Production of copolymer of 3,6-dichloro-9-vinylcarbazole and 9-vinylcarbozole 3,6-Dichlorocarbazole 0.6 gr. and 9-vinylcarbazole 1.0 gr. was placed in a polymerization tube substituted with nitrogen gas, and was heated at 120°C for 6 hours. The reaction mixture was dissolved in benzene and precipitated by methanol. Such procedure was three times repeated. The resultant was a white polymer 1.2 gr. From analysis of nitrogen and chlorine, this product was recognized as copolymer of chlorovinylcarbazole and vinylcarbazole in a molar ratio of about 1.0 : 2.5.

Cumarone resin used as plasticizer for chlorinated poly-9-vinylcarbazole in this invention is a thermoplastic resin of relatively low molecular weight mainly composed of polymers of cumarone and indene. The cumarone resin is also called "coumarone-indene resin." The cumarone resin may be produced by the catalytic and thermal polymerization of mixtures containing cumarone and indene. Some cumarone resins comprise chiefly polyindenes. According to this invention, cumarone resin having average molecular weight of 200 – 800, preferred with 200 – 300, is employed.

Cumarone resin is soluble in organic solvents such as benzene, monochlorobenzene, and methylene chloride which are generally used as solvent for organic photosensitive materials, and is mutually soluble with organic photoconductive materials and binder resins employed for forming a coating film of the photosensitive material. Cumarone resin can give transparent and chemically stable photosensitive layer. As is clear from the following Examples, the photosensitive material containing cumarone resin gives a photosensitive layer of high flexibility and high surface smoothness, which is so stable that neither crack is formed nor the transparency is lowered during longe storage and handling.

The inventors have further found that cumarone resin used as a plasticizer for chlorine substituted poly-9-vinylcarbazole does not adversely affect the electrophotographic characteristics.

For example, when 50 parts of cumarone resin is added to 100 parts of chlorine substituted poly-9-vinylcarbazole, any lowering of surface potential and photosensitivity are hardly observed as compared with the not added one. Particularly, cumarone resin having average molecular weight ranging from 200 to 300 which is in a liquid state has high mutual solubility with other various resins and gives a large plasticizing effect and furthermore, lowering of photosensitivity of the chlorine substituted poly-9-vinylcarbazole is very little. As described above, combination of chlorine substituted poly-9-vinylcarbazole and cumarone resin can produce organic photosensitive materials for electrophotography of high photosensitivity and satisfactory physical properties.

The photosensitive materials for electrophotography according to this invention may be used together with chemical sensitizers such as tetracyanoethylene, chloranil, naphthoquinone, picric acid, monochloroacetic acid and the like. Further, the photosensitive materials of this invention may be used together with optical sensitizers such as crystal violet, rhodamine B, methyl violet and the like.

The photosensitive material of this invention may be sensitized by photochemical reaction with carbon tetrabromide.

The photosensitive material of this invention may be made into a photosensitive member in the following forms. The photosensitive material can be used as a photosensitive layer in a two-layer or multilayer photosensitive member for electrophotography, and in a particular case, the photosensitive material can be used as a self-supporting photosensitive layer.

The important use of the photosensitive material of this invention is in photosensitive films which are required to be flexible as in usual photographic film. For example, they are photosensitive films for slides and overhead projectors. An example of structure of such films is that a transparent electroconductive layer such as a polymer having a quaternary ammonium group or copper iodide is coated on a transparent and flexible support such as polyester, cellulose acetate, polycarbonate and the like films, and if desired, an auxiliary layer for helping adhering is provided on the electroconductive layer, and then an organic photoconductive layer is provided thereon.

The photosensitive materials according to this invention may be subjected to known electrophotographic processes to produce images.

The following examples are given for illustrating the present invention, but should not be construed as limitation to the present invention.

Example 1

| | |
|---|---|
| Chlorinated poly-9-vinylcarbazole (Chlorine content 8.75%) | 2 g. |
| Carbon tetrabromide | 0.1 g. |
| 9-vinylcarbazole | 0.2 g. |
| Benzene | 40 ml. |

Above ingredients were mixed to form a solution. The resulting solution was irradiated by a high pressure mercury lamp of 450 W for 5 minutes at a distance of 20 cm. and allowed to stand in a dark place for 24 hours. Then, 1 g. of cumarone resin (Trade name, "Cumarone L," molecular weight 220 – 300, supplied by Fuji Seitetsu K.K.) was added to and dissolved in the solution. The resulting solution was coated on an electroconductive polymer layer (2 $\mu$ thick) (Trade name "Conductive Polymer 251," supplied by Calgon Corp.) coated on a triacetate film (100 $\mu$ thick), and thus a cumarone resin layer of 5 $\mu$ thick was formed to produce a photosensitive film of high flexibility and having smooth surface. The photosensitive film was compared with other photosensitive films in which no plasticizer was used, or epoxy resin and dioctylphthalate were added as plasticizer, and the results are shown in Table 2. With respect to sensitivity, the photosensitivity is determined by using an Electrostatic paper analyzer (supplied by Kawaguchi Denki K.K.). The measurement was carried out at a charging potential of − 6KV and a light intensity of 100 lux. And the amount of light required for reducing the surface potential to one-third of the initial potential was measured. The photosensitivity of a photosensitive film containing no plasticizer but the other ingredients being the same as this Example, was 100 lux.sec.

The specific sensitivity was defined as follows:

$$\text{Specific sensitivity} = \frac{\text{Photosensitivity of a photosensitive film containing a plasticizer}}{\text{Photosensitivity of a photosensitive film not containing a plasticizer}}$$

Table 2

| Plasticizer | Initial potential | Specific sensitivity |
|---|---|---|
| None | 400 V | 1.00 |
| Cumarone L | 440 V | 0.80 |
| Epoxy resin | 450 V | 0.18 |
| Dioctylphthalate | 0 V | — |

As shown in the above Table, it will be understood that when cumarone resin is used as plastisizer, the initial potential and the specific sensitivity are satisfactory from the electrophotographic point of view.

EXAMPLE 2

Following the procedure of Example 1, but the amount of Camarone L were varied and flexibility and specific sensitivity of the photosensitive films were determined. The results are listed in Table 3 below.

Table 3

| Amount of Cumarone L | Plasticity | Specific Sensitivity |
|---|---|---|
| 0 g. | low | 1.00 |
| 0.2 g. | slightly good | 1.00 |
| 0.5 g. | good | 0.95 |
| 1.0 g. | good | 0.80 |
| 2.0 g. | good | 0.43 |

The above Table shows that when amount of cumarone resin is higher than 10 percent by weight on the basis of the organic photoconductive material, there is obtained a transparent film of high flexibility and having a smooth surface, and further when the amount of cumarone resin is less than 50 percent by weight on the basis of the organic photoconductive material, the electrophotographic characteristics are hardly deteriorated and the adhesiveness is also excellent.

Example 3

| | |
|---|---|
| Chlorinated 9-vinylcarbazole (chlorine content 4.4%) | 2 g. |
| Malachite Green | 0.005 g. |
| 2-Methylanthraquinone | 0.2 g. |
| Methylene chloride | 20 ml. |

To a solution composed of the above ingredients was added 0.5 g. of cumarone resin (Trade mark, Cumarone L, supplied by Fuji Seitetsu K.K.) and the resulting mixture solution was coated on the triacetate film as used in Example 1 to form a coating film of 5 $\mu$ thick and dried to produce a photosensitive film of high flexibility and good adhesiveness. The resulting photosensitive film was subjected to charging, exposing and developing with a liquid developer. An exposure of 220 lux.-sec. was necessary to obtain visual images of high fidelity to the original images. On the contrary, when cumarone resin was not added, the exposure required was 200 lux.sec., but some fine cracks appeared during one month storage.

Example 4

| | |
|---|---|
| Chlorinated poly-9-vinylcarbazole (Chlorine content 16.7%) | 2 g. |
| Crystal violet | 0.002 g. |
| Cumarone resin (Trade name, Cumarone L | |

Example 4-Continued

| | |
|---|---|
| supplied by Fuji Seitetsu K.K.) | 0.3 g. |
| Methylene chloride | 20 ml. |

A solution composed of the above ingredients was applied to a high quality paper having a polyvinylalcohol layer thereon to form a photosensitive layer of 7 $\mu$ thick. The resulting photosensitive member was subjected to an electrophotographic process as in Example 3 to produce a good image at 180 lux.sec.

Example 5

| | |
|---|---|
| Poly-3,6-dichloro-9-vinylcarbazole | 2 g. |
| Malachite Green | 0.005 g. |
| 2-Methylanthraquinone | 0.2 g. |
| Methylene Chloride | 20 ml. |
| Cumarone Resin (Trade name, Cumarone R 1/2, softening point about 85°C, supplied by Fuji Seitetsu K.K.) | 0.5 g. |

A solution composed of the above ingredients was applied to a high quality paper having a polyvinylalcohol layer thereon to form a photosensitive layer of 7 $\mu$ thick.

Electrophotographic process was applied thereto as in Example 3 to give a good image at an exposure amount of 200 lux.sec.

Sensitivity of a photosensitive member prepared in a way similar to above but using polystyrene in place of cumarone resin was 200 lux.sec., but the adhesiveness and flexibility are not sufficient.

Example 6

| | |
|---|---|
| Poly-3-chloro-9-vinylcarbazole | 2 g. |
| Polystyrene | 2 g. |
| Crystal violet | 0.002 g. |
| Cumarone resin (Trade name, Cumarone V1/2; softening point, about 120°C, supplied by Fuji Seitetsu K.K.) | 0.1 g. |
| Methylene chloride | 20 ml. |

A solution composed of the above ingredients was applied to a triacetate film as used in Example 1 to form a coating film (5$\mu$ thick as solid matter) and dried to produce a photosensitive film of high flexibility. The resulting photosensitive film was subjected to an electrophotographic process comprising charging, exposing, and developing by a liquid developer, and there was obtained an excellent image of high fidelity to the original image.

We claim:

1. An organic photoconductive material which comprises 100 parts by weight of a chlorine substituted poly-9-vinylcarbazole containing from about 2–43 percent by weight of chlorine and 10–50 parts by weight of a liquid cumarone resin having an average molecular weight of about 200–300.

* * * * *